United States Patent Office 3,804,765
Patented Apr. 16, 1974

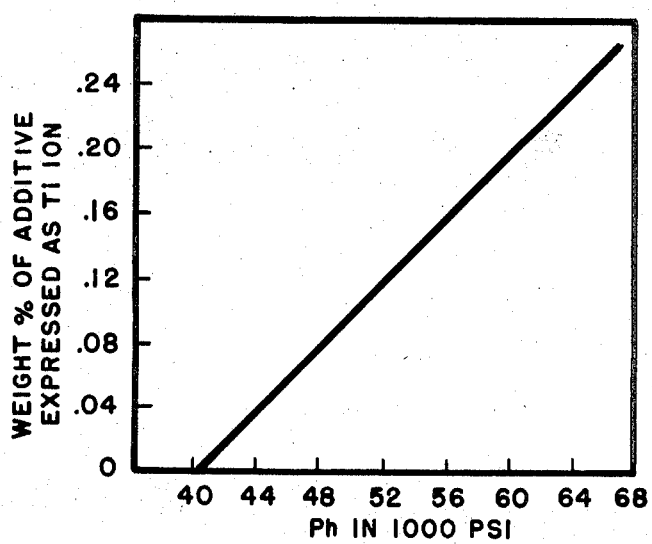
FIG. 3
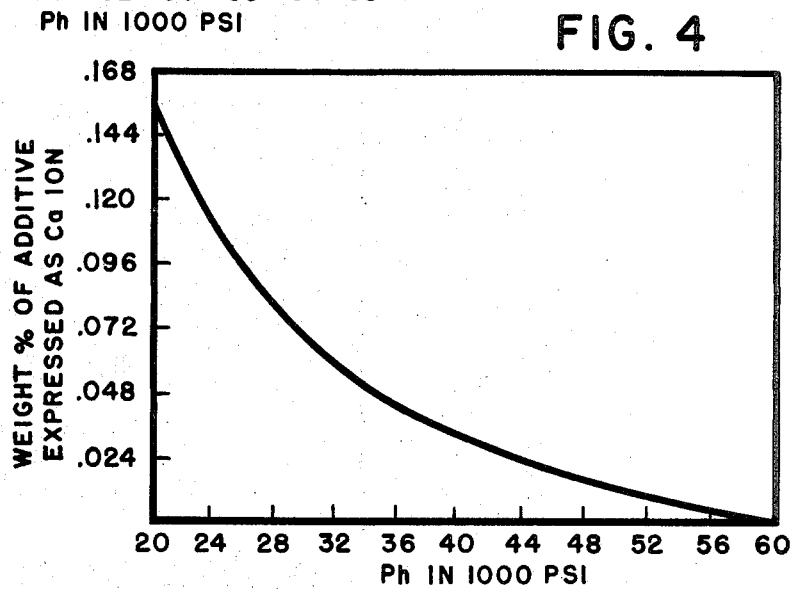
FIG. 4
FIG. 6
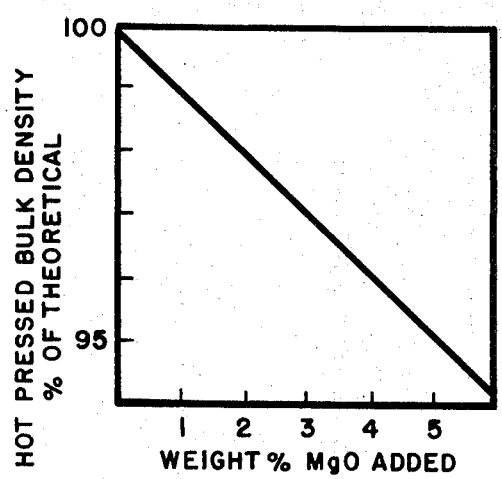
FIG. 5
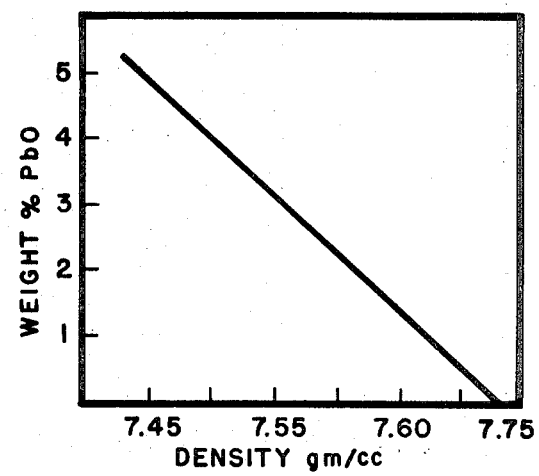

---

3,804,765
ADJUSTING FERROELECTRIC CERAMIC CHARACTERISTICS DURING FORMATION THEREOF
Dean A. Buckner, Alameda, and Paul D. Wilcox, Albuquerque, N. Mex., assignors to the United States of America as represented by the United States Atomic Energy Commission
Filed June 13, 1972, Ser. No. 262,414
Int. Cl. C04b 35/46, 35/48
U.S. Cl. 252—62.9
2 Claims

ABSTRACT OF THE DISCLOSURE

A proces for forming lead zirconate titanate-type ferroelectric ceramics having desired characteristics by providing a mixture of the desired oxide powders to form the ferroelectric ceramic; calcining said mixture to convert the same to a ferroelectric phase; separating a portion of the resulting calcined material and thereafter milling, blending and compressing said portion to a slug, sintering the slug to a dense mass and measuring the characteristics of the sintered slug; then mixing an additive determined by said measured characteristics with said remaining calcined material to modify the remaining calcined material characteristics to a predetermined level; and thereafter milling, blending and compressing the additive containing calcined material to another slug and sintering said another slug to a dense mass.

BACKGROUND OF INVENTION

Ferroelectric ceramics are commonly used in a wide range of applications and uses including piezoelectric-type powder supplies, transducers, circuit elements, electrooptic devices and the like. These ferroelectric ceramics are commonly made from lead zirconate-lead titanate solid solutions which may have various amounts of tin (referred to as PSZT), or barium (referred to as PBZT), lanthanum (referred to as PLZT) or similar elements substituted for various amounts of the lead as well as additional additives as an oxide of magnesium (Mg), manganese (Mn), strontium (Sr), bismuth (Bi), niobium (Nb), tin (Sn), antimony (Sb), iron (Fe), chromium (Cr) and nickel (Ni), as well as others, which are distributed in the lattice structure of the solid solution. The choice of the respective substituent or additive used is dependent upon the desired properties of the ferroelectric ceramic and may vary from zero to various levels depending upon the desired properties.

The ferroelectric ceramics for these applications are usually formed by providing a uniform mixture of the respective constituents to achieve a desired stoichiometry of the respective constituents as a uniform mixture of the oxide powders. This mixture is then calcined at some temperatures and times to convert the mixed oxides to the ferroelectric phase and a solid solution of all the constituents. The calcined ferroelectric material is then further processed to a desired density and homogeneity level required by the particular application or use of the material.

When a particular application or use is identified for a ferroelectric ceramic, a particular combination of materials and processing parameters may be selected from prior experience or from empirical techniques to produce a ferroelectric which, hopefully, will exhibit a desired set of characteristics to perform such application or use. Even though some products formed with the so identified materials and processing may often produce ferroelectric ceramics which do exhibit the desired characteristics, many times they may not do so.

Each application or use may require a particular combination of characteristics to achieve a desired operation or function of the ferroelectric. It has been found that even though the same or apparently the same raw materials are used with apparently the same or identical processing and processing parameters, the finished product very often varies in one or more characteristics from the characteristics exhibited by a finished product from a seemingly identical process run. This occurs even when the raw materials for different process runs are selected from the same raw material stock. The change in characteristics very often is of sufficient extent to make the finished product unuseable for the purpose for which it was intended. In such cases, the material batch which did not exhibit the proper characteristics within some acceptable range would be discarded as it was felt that the material, after conversion to a ferroelectric phase, could not be altered to change its ferroelectric characteristics. Instead, attempts were made to change process parameters or raw materials to correct material product deficiencies, however without any predictability or consistency in results. Because of the cost of materials being used, the process times required to perform the process and other considerations, such discarding may be very costly. It would thus be desirable if some method could be devised which would insure production of ferroelectric ceramics having characteristics within acceptable ranges.

SUMMARY OF INVENTION

In view of the above, it is an object of this invention to provide an improved process for forming ferroelectric ceramics having characteristics within a desired range.

It is a further object of this invention to provide a process for forming ferroelectric ceramics in which the characteristics of the ferroelectric are modified to some desired level after the ferroelectric raw materials have been calcined to the ferroelectric phase.

It is a further object of this invention to provide a process for varying the remanent polarization, pressure-induced phase transition, bulk density, and piezoelectric coefficients dependent on these properties during the preparation of the ferroelectric ceramic.

Various other objects and advantages will appear from the following description of the invention, and the most novel features will be particularly pointed out hereinafter in connection with the appended claims. It will be understood that various changes in the details and materials which are herein described and illustrated in order to explain the nature of the invention may be made by those skilled in the art.

The invention comprises a process for forming lead zirconate titanate type ferroelectric ceramics having prescribed characteristics including providing a mixture of the ferroelectric ceramic constituent powders; calcining and converting said mixture to a ferroelectric phase; forming a portion of the resulting material into a homogeneous, dense mass and measuring its characteristics; then mixing an additive, determined by the measured characteristics, with the remaining calcined material; and thereafter forming the additive containing remaining portion to a homogeneous, dense mass.

DESCRIPTION OF DRAWING

The invention is illustrated in the accompanying drawing wherein:

FIG. 3 is a graph showing the effect to the pressure-induced phase transition by adding titanium (Ti) ions to such materials;

FIG. 4 is a graph showing an effect similar to that of FIG. 3 from adding of calcium (Ca) ions.

FIG. 5 is a graph showing changes in bulk density which may be achieved by additions of lead oxide (PbO) to similar materials; and FIG. 6 is a graph showing similar effects to bulk density from additions of magnesium oxide (MgO).

DETAILED DESCRIPTION

Figure 1:
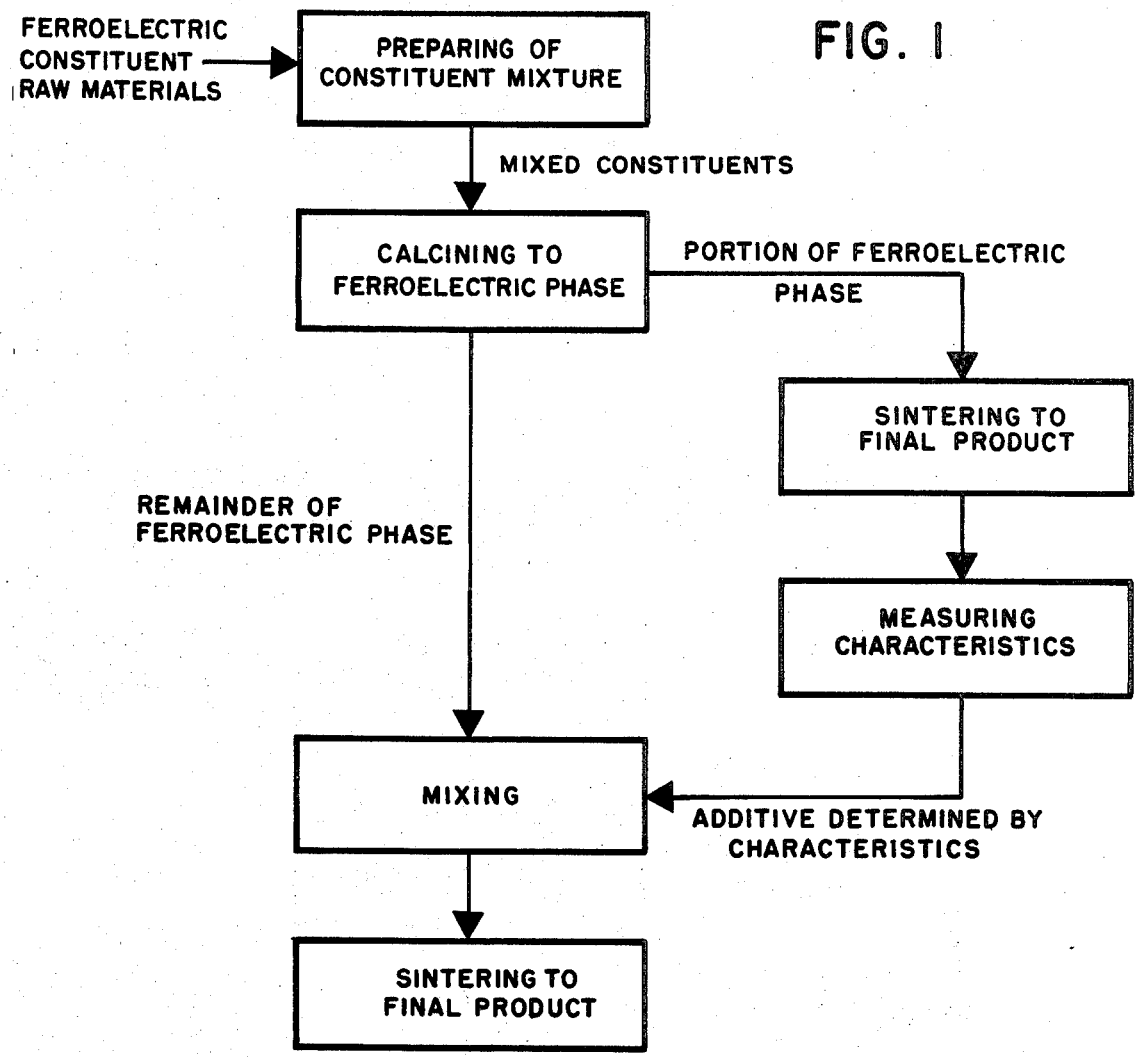
FIG. 1 is a box diagram showing the various steps of the invention.

The process of this invention is carried out by first preparing a mixture of the respective constituents of the ferroelectric ceramic to be formed. The individual constituents should be intimately and homogeneously mixed with each other to insure the desired reaction of the constituents to the ferroelectric phase and to provide a product having generally predictable characteristics.

The constituents, oxide or the like mixtures, may be in a powder form of generally less than about 10 microns in size and may be prepared by appropriate mixing of the constituent raw materials in powder or particulate form or by chemical precipitation of the constituents from suitable solutions. A typical process for preparing the mixed constituent powders from powder raw materials may include weighing the desired constituent powders, which are often in the form of oxides or carbonates, of all the constituents in the proper amounts computed from their atom formulas preferably using reagent grade, or better, materials, milling the combined raw materials into an intimate homogeneous mixture in a ball or other mill and a water slurry for a period of one to several hours, pan or freeze drying the slurry, and if desired, mixing additionally the dried material. A typical chemical preparation process may include mixing metal alkoxides of the desired constituent quantities to provide a predetermined amount of the metal in the resulting ferroelectric phase. Oxides or the like of the constituents may be made to coprecipitate simultaneously as a homogeneous mixture by hydrolyzing the alkoxide solutions. The precipitate may then be appropriately dried and further mixed, if desired. In some instances, it may be desirable to react the metal alkoxide solution with a quaternary ammonium hydroxide to form a solution including the metal or mixtures of metals as a complex ion. This complex ion containing solution may then be mixed with a metal salt solution of a different metal and the complex ion and metal salt ion reacted to form a precipitate which may then be appropriately dried and mixed.

The dried mixture, in either the form of a loose powder (having a particle size generally less than about 10 microns) or as a dry pressed slug, may then be calcined at an optimum temperature within the range from about 400° C. to about 1100° C. for from about 0.1 to 30 hours (generally around 2 to 4 hours for crucible calcined materials) to produce a solid solution, ferroelectric phase of the respective constituent materials. The optimum temperature depends on the particular process, raw material, and composition being used. The calcining step completes the conversion of the raw materials into a desired ferroelectric phase material. This calcined material governs the properties of the final fired product.

A portion of the so prepared calcined ferroelectric phase may then be separated from the remainder of the ferroelectric phase material and further processed to the form of the final product or material. This further processing may include comminuting and mixing, such as by crushing and ball milling the ferroelectric phase material with water, to prepare a homogeneous fine particle material which may then be formed (typically by cold pressing, slip casting, etc.) into slugs of appropriate size and dimension. The comminuting may be to a particle size of below about 1 to about 3 microns while the forming may be achieved by pressing with pressures of from about 10,000 to about 20,000 p.s.i. The slugs may then be sintered at temperatures from about 1100° C. to about 1350° C. to obtain the desired density (generally above about 90% theoretical and often above 98% theoretical density) and other properties of the final product. The method of this invention may be equally applicable to applications where holes are left in the final product which result in an overall density less than 90% of theoretical. If desired, the slug may be subjected to applied pressures up to about 5000 p.s.i. during the sintering. The sintering may be continued for periods which extend from about 0.5 to about 48 hours or more. The respective sintering steps may be carried out in air, oxygen, lead oxide, or any other appropriate atmosphere depending upon the properties desired of the final product.

The sintered slug may then be subjected to appropriate testing and measuring techniques such as those set forth in Proceedings of the IRE, July 1961 beginning at page 1161 and entitled IRE Standards on Piezoelectric Crystals: Measurement of Piezoelectric Ceramics 1961, to determine its properties and thus for characterization thereof. To do so it may be desirable to slice or otherwise machine or form the slug into a configuration which may be more readily handled and subjected to these tests using well known apparatus. When the properties of the ferroelectric sintered material have been determined they may be compared with the properties or characteristics which were desired of this particular material. Under previous practices if these properties did not provide the requisite results, the entire batch of calcined material was deemed unsuitable and was either discarded or stored for usage in some less exacting requirement. It has been discovered by the present invention that such batches need not be discarded but may be salvaged, even though these measured properties are not the same or do not fall within an acceptable range of values. As described below, an appropriate additive may be selected and added to the remaining portion of the calcined ferroelectric phase above in prescribed amounts by computer or the like comparison techniques with the measuring apparatus.

The remaining portion of the batch, together with the selected additive, may be comminuted and mixed to prepare a fine particle mixture thereof. This mixture may then be formed into slugs and sintered in the same manner and under the same conditions as the first portion of the ferroelectric phase described above. It has been found that this remaining portion of the ferroelectric phase after such preparation and sintering may thus be modified to exhibit the originally desired properties when modified by the appropriate additive in appropriate amounts and subjected to the same measuring and testing of characteristics and characterization thereof.

Typical properties which may be controlled or changed in a particular predictable manner in accordance with this invention include remanent polarization ($P_r$), pressure-induced phase trasition ($P_h$), bulk density and those properties which depend on the above including the piezoelectric coefficients of the ferroelectric ceramic. It has been found that it may even be desirable that the original selected quantities of raw material constituents be chosen so as to produce a material which exhibits properties slightly different from those of the desired final product. The material may then be processed as above and the ferroelectric phase portion tested and selected amounts of desired additives mixed with the remaining portion of ferroelectric phase to bring the properties of the remaining portion to the predetermined levels. For example the batch may be formulated deficient in Ti ion in order that Ti ion may later be added to achieve exactly the desired $P_h$ as adding Ti ion may be more expedient than would be additions of Ca ion to reduce $P_h$.

The remanent polarization property or characteristic may be controlled or changed by adding selected amounts of silicon (Si) ions to the ferroelectric phase. The Si ion may be employed as a granular silicon dioxide ($SiO_2$) liquid suspension or solution which when mixed with the ferroelectric phase and sintered or calcined yields $SiO_2$.

Figure 2:
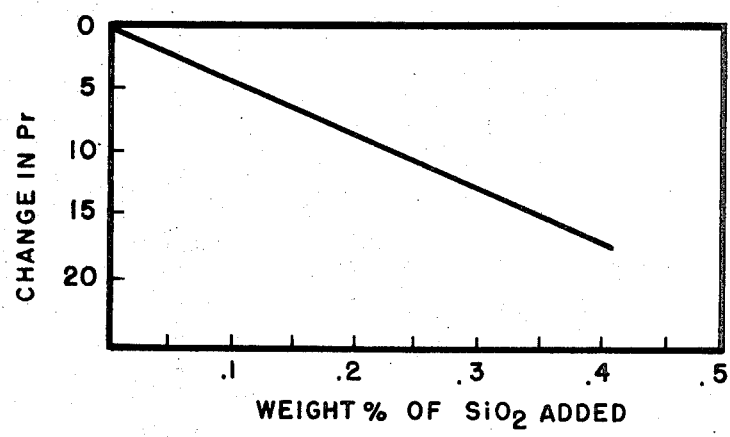
FIG. 2 is a graph of the effect to remanent polarization of lead zirconate-lead titanate ferroelectric ceramics by the addition of $SiO_2$.

FIG. 2 illustrates the affect of adding from greater than 0 to 0.4 weight percent $SiO_2$ to reduce remanent polarization in hot pressed lead zirconate-lead titanate ferroelectric compositions. As can be seen, the change in remanent polarization is directly proportional to the amount of $SiO_2$ added to the ferroelectric phase.

Pressure-induced phase transition may be increased by the addition of from greater than 0 to 0.24 weight percent Ti ions to the calcined material and decreased by the addition of from greater than 0 to about 0.144 weight percent Ca ions. The Ti ions may be utilized in the form of titanium dioxide or lead titanate, the latter being preferred as it tends to blend more uniformly and to maintain the stoichiometry of the ferroelectric composition. The relative effect of adding Ti ions to the ferroelectric phase to the properties of the finished product is shown in FIG. 3 and is also a linear response. The Ca ions may be added by utilizing calcium carbonate in prescribed amounts in accordance with the graph shown in FIG. 4, which indicates the effect of such an additive on the final pressure-induced phase transition of the final product.

The density of the final product may be controlled by adding from greater than 0 to about 5 weight percent PbO or from greater than 0 to about 6 weight percent MgO to the calcined ferroelectric phase material. The lead oxide may be added in any form which will result in PbO upon calcining, for example, lead acetate, PbO and lead carbonate to materials which are atmospheric pressure sintered to final product. The relative effect of the addition of various weight percents of PbO in excess of stoichiometric amounts is shown in FIG. 5 and is a linear function. This effect is reversible by removing lead (Pb) ions, such as by leaching with suitable acids such as acetic acid. Granular particles of recrystallized MgO of large enough size to have limited solubility in the ferroelectric phase, such as greater than about 150 microns particles, may be added in appropriate weight percentages as indicated in FIG. 6 and thus lower the density of the final product by prescribed amounts to pressure sintered final products.

In all of these additives, it should be emphasized that the additive is mixed with the calcined material to produce a desired property or characteristic level in the final product.

As an example of the above description a sufficient amount of raw material constituents to produce a stoichiometric lead zirconate-lead titanate-lead stannate ferroelectric ceramic of 18 kilograms in size was prepared. The composition of the batch was selected in accordance with performance of prior batches of a similar type. The raw materials were weighed in stoichiometric proportions, ball milled, dried and calcined in crucibles at 900° C. for about 5 hours. A small sample (1 kilogram) was then milled, dry-blended and cold pressed at 10,000 p.s.i. into a slug for pressure sintering. Pressure sintering was accomplished at 1250° for about 4 hours at about 560 p.s.i. Test parts were machined and electroded from the resulting slug and $P_r$, $P_h$ and bulk density determined. It was found that $P_r$ was too high for the desired use of the material and required reduction by about 3 to 4 microcoulombs per square centimeter. The remaining portion of the batch was milled with a selected weight percent (.08%) containing the desired amount of silicon dioxide to reduce $P_r$. This mixed ferroelectric phase and additive material was then fired in the same manner as the sample, and upon electrical testing exhibited the correct $P_r$ value.

As a second example; another batch of lead zirconate-lead titanate ferroelectric ceramic of 80 kilograms in size and of predetermined composition was formed. The composition of the batch was such that would be selected for a desired use requiring certain $P_r$, $P_h$ and bulk density. After mixing the raw material oxides of lead, zirconium, titanium and niobium in correct proportions, the mixture was calcined by passing the mixture through a rotating refractory tube containing a hot zone maintained at 1000° C. in such a way that the time taken by the powder mixture to pass through the hot zone was about 12 minutes. The oxides calcined were converted into a ferroelectric phase of homogeneous composition. A one kilogram sample of the calcined batch was processed by compressing the calcine into suitable slugs and heating them in a protected atmosphere of lead oxide vapors to a temperature of about 1300° C. for a period of about 6 hours and then cooled to room temperature. The sintered ceramic slugs were machined into product test pieces and measurements made of their properties. The pressure-induced phase transition was measured at a level of about 54,000 p.s.i. while it was desired to be at a level in excess of 57,000 p.s.i. An addition of about 0.24 weight percent of lead titanate was added to the remaining portion of the ferroelectric phase and processed in the same manner as the sample. The remaining ferroelectric phase and additive was then sintered under the same process parameters and the $P_h$ measured in the final product at a level of about 59,600 p.s.i., which was within the specified range of values for its intended use.

What is claimed is:

1. A process for forming lead zirconate titanate or lead zirconate titanate stannate ferroelectric ceramics having oxide constituents of lead, zirconium, tin and titanium to predetermined characteristics, said characteristics being selected from the group consisting of remanent polarization, pressure induced phase transition, and bulk density, comprising providing a powder mixture of said oxide constituents of said ferroelectric ceramic; calcining said powder mixture at from about 400 to about 1100° C. for from about 0.1 to about 30 hours to the ferroelectric phase; separating a sample portion from said resulting calcined ferroelectric material leaving a remaining portion and thereafter comminuting, mixing and forming said sample portion to a slug, sintering said sample portion slug at a temperature of from about 1100° C. to about 1350° C. for from about 0.5 to about 48 hours to greater than about 90% theoretical density, and measuring the levels of said characteristics of said sintered slug; thereafter mixing an additive selected from the group consisting of from greater than 0 to about 0.4 weight percent $SiO_2$ to reduce remanent polarization, from greater than 0 to about 0.24 weight percent Ti ions to increase pressure induced phase transition, from greater than 0 to about 0.144 weight percent Ca ions to decrease pressure induced phase transition, from greater than 0 to about 6 weight percent MgO to decrease bulk density and mixtures thereof in an amount determined by the levels of said measured characteristics with said remaining portion of said resulting calcined ferroelectric material sufficient to modify said remaining portion of said resulting calcined ferroelectric material to said predetermined characteristics and subsequently comminuting, mixing and forming said additive-containing calcined ferroelectric material to a further slug, and sintering said further slug at a temperature of from about 1100° C. to about 1350° C. for from about 0.5 to about 48 hours to about same density as said sintered sample portion slug.

2. The process of claim 1 wherein said sintering steps include subjecting the slugs to a pressure of up to about 5000 p.s.i.

References Cited
UNITED STATES PATENTS

| | | | |
|---|---|---|---|
| 3,006,857 | 10/1961 | Kulcsar | 252—62.9 |
| 3,549,536 | 12/1970 | Lungo et al. | 252—62.9 |
| 3,649,539 | 3/1972 | Nishida et al. | 252—62.9 |
| 3,649,540 | 3/1972 | Nishida et al. | 252—62.9 |

OSCAR R. VERTIZ, Primary Examiner

J. COOPER, Assistant Examiner